United States Patent
Heikinheimo et al.

(10) Patent No.: US 12,424,200 B2
(45) Date of Patent: Sep. 23, 2025

(54) METHOD AND SYSTEM FOR PERFORMING DOMAIN ADAPTATION OF END-TO-END AUTOMATIC SPEECH RECOGNITION MODEL

(71) Applicant: Speechly Oy, Helsinki (FI)

(72) Inventors: Hannes Heikinheimo, Helsinki (FI); Janne Pylkkönen, Espoo (FI); Antti Ukkonen, Espoo (FI); Samu Tamminen, Helsinki (FI); Juho Kilpikoski, Helsinki (FI)

(73) Assignee: Speechly Oy, Helsinki (FI)

( * ) Notice: Subject to any disclaimer, the term of this patent is extended or adjusted under 35 U.S.C. 154(b) by 516 days.

(21) Appl. No.: 17/412,549

(22) Filed: Aug. 26, 2021

(65) Prior Publication Data
US 2022/0319506 A1    Oct. 6, 2022

(30) Foreign Application Priority Data
Mar. 31, 2021  (FI) .................................. 20215395

(51) Int. Cl.
*G10L 15/06* (2013.01)
*G10L 15/065* (2013.01)
(Continued)

(52) U.S. Cl.
CPC ............ *G10L 15/063* (2013.01); *G10L 15/16* (2013.01); *G10L 15/22* (2013.01)

(58) Field of Classification Search
CPC ....... G10L 15/063; G10L 15/16; G10L 15/22; G10L 15/065
See application file for complete search history.

(56) References Cited

U.S. PATENT DOCUMENTS

| | | | |
|---|---|---|---|
| 2018/0053502 A1* | 2/2018 | Biadsy | G10L 15/197 |
| 2021/0065683 A1* | 3/2021 | Meng | G10L 15/063 |
| 2022/0139380 A1* | 5/2022 | Meng | G06N 3/044 |
| | | | 704/232 |

FOREIGN PATENT DOCUMENTS

CN     110689879 A     1/2020

OTHER PUBLICATIONS

C. Shan et al., "Component Fusion: Learning Replaceable Language Model Component for End-to-end Speech Recognition System," ICASSP 2019—2019 IEEE International Conference on Acoustics, Speech and Signal Processing (ICASSP), Brighton, UK, 2019, pp. 5361-5635, doi: 10.1109/ICASSP.2019.8682490 (Year: 2019).*

(Continued)

*Primary Examiner* — Daniel C Washburn
*Assistant Examiner* — Penny L Caudle
(74) *Attorney, Agent, or Firm* — ZIEGLER IP LAW GROUP, LLC.

(57) ABSTRACT

A method for performing domain adaptation of an end-to-end (E2E) automatic speech recognition (ASR) model. The method includes: obtaining an un-adapted version of the E2E ASR model trained using a first set of transcriptions, the un-adapted version of E2E ASR model including an encoder network, a first prediction network and a joint network; using the first set of transcriptions, while keeping parameters of first prediction network fixed, to train a language model output component to match the first prediction network; using a second set of transcriptions, while keeping parameters of language model output component fixed, to fine-tune the first prediction network for obtaining a second prediction network; and generating an adapted version of the E2E ASR model, wherein the adapted version of the E2E ASR model comprises the encoder network, the second (Continued)

prediction network, the language model output component, and the joint network.

14 Claims, 3 Drawing Sheets

(51) Int. Cl.
  *G10L 15/16* (2006.01)
  *G10L 15/22* (2006.01)

(56) References Cited

OTHER PUBLICATIONS

Bell et al., "Adaptation Algorithms for Neural Network-Based Speech Recognition: An Overview" arxiv.org, Overview Paper Submitted to OJSP, Feb. 28, 2021, XP0181886005, DOI: 10.1109/OJSP.2020.3045349, 32 pages.
Extended European Search Report, European Patent Office, Application No. 22156796.9, mailed Jul. 12, 2022, 5 pages.
Meng et al. "Internal Language Model Estimation for Domain-Adaptive End-to-End Speech Recognition", 2021 IEEE Spoken Language Technology Workshop (SLT), IEEE, Jan. 19, 2021, XP033891307, DOI:10.1109/SLT48900.2021.9383515, 8 pages.

* cited by examiner

METHOD AND SYSTEM FOR PERFORMING DOMAIN ADAPTATION OF END-TO-END AUTOMATIC SPEECH RECOGNITION MODEL

TECHNICAL FIELD

The present disclosure relates to methods for performing domain adaptation of an end-to-end (E2E) automatic speech recognition (ASR) model. Moreover, the present disclosure relates to systems for performing domain adaptation of an end-to-end (E2E) automatic speech recognition (ASR) model.

BACKGROUND

Automatic speech recognition is widely used in devices for providing accessibility to a user by way of voice-based user interfaces. Examples of the same may be voice-controlled dialling, call routing, appliance control, key words searching, simple data entry, preparation of structured documents, speaker characteristic determination, speech-to-text processing, and the like. Traditionally, automatic speech recognition is provided by hybrid models which consist of separate models for acoustic, language and pronunciation. Such hybrid models utilise multiple data sources, and especially large amounts of text-only data.

Recently, the focus in automatic speech recognition technologies has shifted from hybrid models to end-to-end models which integrate the models of acoustic, language and pronunciation into a single network. Such end-to-end models are typically trained from matched speech and transcriptions, making exposure of the end-to-end models to different language content limited in comparison to the hybrid models. One interesting type of the end-to-end models is a Recurrent Neural Network Transducer (RNN-T) model. The RNN-T model consists of separate language and acoustic models, thereby providing decent performance in wide varieties of streaming applications.

However, such end-to-end models have certain limitations associated therewith. Although a prediction network of an end-to-end model may be initialised from a large text corpus, a predictive power of an initial language model remaining after the end-to-end model has been trained with speech data, is unclear. Moreover, several techniques including application of external language models, and utilisation of text-to-speech generated data for fine-tuning the prediction network of the end-to-end model, are being employed to customize the end-to-end model for a particular domain. However, fusion methods are required for using the end-to-end model for out-of-domain tasks, and such fusion methods require drastic changes to the end-to-end model, and/or decoding the same. Present techniques for adaptation of the end-to-end models for out-of-domain tasks are cumbersome and far from satisfactory (as presently obtained out-of-domain accuracy is quite poor).

Therefore, in light of the foregoing discussion, there exists a need to overcome the aforementioned drawbacks associated with conventional techniques for domain adaptation of end-to-end automatic speech recognition models.

SUMMARY

The present disclosure seeks to provide a method for performing domain adaptation of an end-to-end (E2E) automatic speech recognition (ASR) model. The present disclosure also seeks to provide a system for performing domain adaptation of an end-to-end (E2E) automatic speech recognition (ASR) model. An aim of the present disclosure is to provide a solution that overcomes at least partially the problems encountered in prior art.

In one aspect, an embodiment of the present disclosure provides a method for performing domain adaptation of an end-to-end (E2E) automatic speech recognition (ASR) model, the method comprising:
   obtaining an un-adapted version of the E2E ASR model that is trained using a first set of transcriptions, wherein the un-adapted version of the E2E ASR model comprises
   an encoder network that receives acoustic signal frames and outputs encoded acoustic signal frames;
   a first prediction network, wherein a given prediction network receives at least one previous output speech element and outputs a predicted output speech element, the predicted output speech element being predicted based on the at least one previous output speech element; and
   a joint network that receives and processes the encoded acoustic signal frames and the predicted output speech element to output a conditional probability distribution over a next output speech element;
   using the first set of transcriptions, while keeping parameters of the first prediction network fixed, to train a language model output component to match the first prediction network, wherein the language model output component and a given prediction network collectively induce a language model;
   using a second set of transcriptions, while keeping parameters of the language model output component fixed, to fine-tune the first prediction network for obtaining a second prediction network; and
   generating an adapted version of the E2E ASR model, wherein the adapted version of the E2E ASR model comprises the encoder network, the second prediction network, the language model output component, and the joint network.

In another aspect, an embodiment of the present disclosure provides a system for performing domain adaptation of an end-to-end (E2E) automatic speech recognition (ASR) model, the system comprising a processor configured to execute a method of the aforementioned aspect.

Embodiments of the present disclosure substantially eliminate or at least partially address the aforementioned problems in the prior art, and enable efficient domain adaptation of end-to-end automatic speech recognition models, while retaining generalization capabilities thereof.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides a method for performing domain adaptation of an end-to-end (E2E) automatic speech recognition (ASR) model, the method comprising:
  obtaining an un-adapted version of the E2E ASR model that is trained using a first set of transcriptions, wherein the un-adapted version of the E2E ASR model comprises
  an encoder network that receives acoustic signal frames and outputs encoded acoustic signal frames;
  a first prediction network, wherein a given prediction network receives at least one previous output speech element and outputs a predicted output speech element, the predicted output speech element being predicted based on the at least one previous output speech element; and
  a joint network that receives and processes the encoded acoustic signal frames and the predicted output speech element to output a conditional probability distribution over a next output speech element;
  using the first set of transcriptions, while keeping parameters of the first prediction network fixed, to train a language model output component to match the first prediction network, wherein the language model output component and a given prediction network collectively induce a language model;
  using a second set of transcriptions, while keeping parameters of the language model output component fixed, to fine-tune the first prediction network for obtaining a second prediction network; and
  generating an adapted version of the E2E ASR model, wherein the adapted version of the E2E ASR model comprises the encoder network, the second prediction network, the language model output component, and the joint network.

In another aspect, an embodiment of the present disclosure provides a system for performing domain adaptation of an end-to-end (E2E) automatic speech recognition (ASR) model, the system comprising a processor configured to execute the aforementioned method.

The present disclosure provides the aforementioned method and system for performing domain adaptation of the end-to-end (E2E) automatic speech recognition (ASR) model. The method utilizes the first set of transcriptions, while keeping the parameters of the first prediction network fixed, to effectively train the language model output component to match the first prediction network. Then, the method utilizes the second set of transcriptions, while keeping the parameters of the language model output component fixed as a regularizing constraint, to fine-tune the first prediction network for obtaining the second prediction network that is compatible with the joint network. Such an approach ensures that the first prediction network does not change in ways that would be harmful for the E2E ASR model decoding. This approach to performing domain adaptation allows for simple neural language model adaptation techniques to be applicable directly to the given prediction network, or to the E2E ASR model. The method takes advantage of the E2E ASR model's inherent structure, where the given prediction network is interpreted as the language model, to apply fast adaptation to said model. Adapting the E2E ASR model avoids the need for complicated decoding time fusions and external language models. The method for performing domain adaptation of the E2E ASR model allows the E2E ASR model to quickly adapt to different domains using appropriate regularizations, without losing knowledge (or generalizing capabilities) of an old domain that it was trained for, and without increasing decoding complexity. Moreover, the aforementioned method for performing domain adaptation of E2E ASR model is fast, requires no changes to be made to the un-adapted E2E ASR model, and performs well even when a limited amount of data is available from a target domain. The system described herein is easy to implement, cost-efficient, and easy to use.

Throughout the present disclosure, the term "domain adaptation" refers to an application, or an adaption of a model trained for one domain to another domain. Herein, domain adaptation is performed on the end-to-end (E2E) automatic speech recognition (ASR) model in order to make the E2E ASR model adaptable to multiple domains. For example, the E2E ASR model may be trained to automatically recognize speech in education domain, but it may be adapted using the method and system described herein, to also automatically recognize speech in hospitality domain.

Throughout the present disclosure, the term "automatic speech recognition (ASR)" refers to conversion of spoken words (i.e., speech, or voice) into text. Typically, ASR is the first step in enabling voice-activated applications that process voice for performing a given function. Similar to other natural language processing applications, ASR systems require a wealth of diverse training data. Such training data may relate to one domain, or multiple domains. Examples of these domains include but are not limited to medicine, education, fashion, law, photography, physics, mechanical engineering, chemical engineering, computer engineering, hospitality, baking, and nutrition. It will be appreciated that ASR may be implemented using a variety of different models, including an end-to-end model. The E2E ASR model integrates separate sub-models for acoustic, language, and pronunciation processing into a single model. Optionally, the E2E ASR model is capable of deciphering multiple dialects in a given language that it is trained for. As an example, the E2E ASR model may be implemented as a Recurrent Neural Network Transducer (RNN-T) model.

The un-adapted version of the E2E ASR model refers to a version of the E2E ASR model prior to performing domain adaptation therein. The un-adapted version of the E2E ASR model is trained using matched speech and transcriptions and relies on mapping a sequence of the acoustic signal frames into a sequence of output speech elements forming a word or series of words based on the at least one previous output speech element ($X_{i-1}$) and the predicted output speech element ($x_i$). Optionally, the un-adapted version of the E2E ASR model is any conventionally available end-to-end automatic speech recognition model. The first set of transcriptions refers to the transcriptions that are inputted for training the E2E ASR model. As an example, wherein the first set of transcriptions has a corpus of text-based data. Optionally, the first set of transcriptions relates to a given domain. Since same or similar words may be used for different purposes in different social and professional settings, the E2E ASR model may be adapted for the different purposes and/or domains at different points of time.

Optionally, the un-adapted version of the E2E ASR model is obtained by the processor, from a local device or an external device. In such a case, the local device or the external device are communicably coupled with the processor. Alternatively, optionally, the un-adapted version of the E2E ASR model is generated by the processor.

The encoder network encodes the acoustic signal frames ($Z_t$). The encoder network extracts acoustic features useful for speech recognition from the received acoustic signal frames and generates the encoded acoustic signal frames. Moreover, the acoustic signal frames include high-level representations of the extracted acoustic features. Optionally, the encoder network is implemented as an artificial neural network. Optionally, the encoder network encodes the acoustic signal frames into a sequence of binary numbers which can be understood by the E2E ASR model. The acoustic signal frames are acoustic signals (for example, such as noises or sounds) captured in predefined intervals of time or frames. The acoustic signals may pertain to sounds caused by a person, an animal, an instrument, and the like. Optionally, the acoustic signal frames comprise human speech signals pertaining to the given domain. The acoustic signal frames are converted to the encoded acoustic signal frames such that the acoustic signal frames may be easily understood and read (i.e., processed) by the E2E ASR model. Optionally, the acoustic signal frames are encoded as a sequence of binary numbers represented as the encoded acoustic signal frames.

The first prediction network predicts the predicted output speech element ($x_i$) based on the at least one previous output speech element ($X_{i-1}$). Such predictive processing is based on the concept of patterns, such that once a pattern is inferred from the at least one previous output speech element, the predicted output speech element is predicted based on the pattern. The at least one previous output speech element relates to a speech element having i–1 symbols, which may be outputted from the un-adapted version of the E2E ASR model previously. Since the at least one previous output speech element relates to the speech element with i–1 symbols, the i–1 symbols provide sufficient and relevant data to the first prediction network for outputting the predicted output speech element. The first prediction network is the prediction network of the un-adapted version of the E2E ASR model. The output of the first prediction network is an internal feature representation rather than a conditional probability distribution over the ith token given the previous tokens, as is required from a language model. A given speech element refers to a continuous piece of speech beginning and ending. There might be a clear pause in the speech. Furthermore, as an example, the speech element can be any word or part-of-a-word with a written representation, coming from a fixed dictionary or a "lexicon", decided before the initial E2E model training. Furthermore, the at least one previous output speech element is mathematically represented as $X_{i-1}=x_0, x_1, \ldots, x_{i-1}$. For example, if the at least one previous output speech element ($X_{i-1}$) is a sequence: s, u, n, r, i, s, of speech elements, the predicted output speech element may be speech element 'e', which completes and forms an utterance 'sunrise'.

The joint network joins (namely, combines) outputs of the encoder network and the first prediction network to produce a vector of probabilities (called the conditional probability distribution) over a next output speech element, such that the probabilities of each value in the vector are proportional to a relative scale of each value in the vector. Herein, the conditional probability distribution over the next output speech element provides the probability distribution of the next output element depending on the encoded acoustic signal frames and the predicted output speech element. The conditional probability distribution is the probability distribution over an ith speech element on the condition that the predicted i–1th speech element and the encoded acoustic signal frames are provided, and the conditional probability distribution is represented as $P(X_i|x_{i-1}, Z_t)$. Optionally, the joint network combines the outputs of the encoder network and the first prediction network to produce logit values and converts the logit values into the conditional probability distribution over the next output speech element.

The term "language model output component" refers to a component of the language model which is responsible for outputting the conditional distribution since the language model output component is trained to match the first prediction network. The language model refers to a statistical tool which given a sequence of speech elements, assigns a probability to the whole sequence. The language model is collectively induced by the language model output component and the given prediction network. The technical effect of training the language model output component using the first set of transcriptions is that such training avoids a mismatch of the language model output component with the first prediction network, since the first prediction network is originally trained with the first set of transcriptions.

Optionally, the language model output component is trained using an autoregressive language model loss function $CE(x,P)$. The autoregressive language model loss function refers to a function of loss being observed with respect to an autoregressive language model. This function of loss is used to optimize the language model output component during training. The autoregressive language model typically predicts future behaviour based on past behaviour and is used for forecasting when there is some correlation between values in a time series and the values that precede and succeed them. For example, in the domain of automatic speech recognition, the autoregressive language model may predict future output speech elements based on past output speech elements. The autoregressive language model loss function minimizes error(s) in predicting a future speech element (i.e., a next speech element) in a training sequence, using a standard autoregressive language model loss, such as cross-entropy.

Optionally, the language model output component is a feed-forward network having a softmax output layer, the language model output component outputting a conditional probability distribution ($P(X_i|x_{i-1})$) over the predicted output speech element. The feed-forward network is a neural network having multiple processing units organized in layers, such that information being shared between the processing units always moves in one direction from an input layer to an output layer. This means that the information being shared between the processing units does not move backwards or in cycles. While the information moves through the feed-forward network, it is processed by the processing units. A technical advantage of having the language model output component as the feed-forward network is that feed-forward network models offer improvements in training stability and training speed, as opposed to when feed-forward network models are not utilised.

The term "softmax output layer" refers to an output layer of a given neural network which uses a softmax function as an activation function. The softmax function provides an output as the conditional probability distribution. The softmax output layer of the language model output component is integrated on top of the given prediction network, such that the given prediction network and the language model output component be collectively adapted as the language model. The conditional probability distribution over the predicted output speech element refers to a probability distribution over an $i^{th}$ speech element (for example, such as, the predicted output speech element ($x_i$)) on the condition that i−1 speech elements are provided, is the probability distribution being represented as $P(X_i|x_{i-1})$. Beneficially, the softmax output layer normalises the output of the language model output component (as the conditional probability distribution), providing significant accuracy gains in target tasks.

The second set of transcriptions refer to the transcriptions inputted for fine-tuning the first prediction network to ultimately obtain the second prediction network. The second set of transcriptions, similarly to the first set of transcriptions, has a corpus of text-based data in multiple languages. Optionally, the second set of transcriptions comprises a plurality of adaptation examples. Optionally, the second set of transcriptions and the first set of transcriptions both relate to a same domain. Alternatively, the second set of transcriptions and the first set of transcriptions relate to separate domains. The second prediction network predicts the predicted output speech element based on the at least one previous output speech element. Such predictive phenomenon is based on the concept of patterns, such that once a pattern is established pertaining to the at least one previous output speech element, the predicted output speech element is predicted based on the pattern. Notably, the domain adaptation of the E2E ASR model involves adapting the given prediction network of said model to induce the language model along with the language model output component, and fine-tuning of the given prediction network.

It will be appreciated that while training the language model output component, the parameters of the first prediction network are kept fixed; and conversely, while fine-tuning the first prediction network, the parameters of the language model output component are kept fixed. Beneficially, this allows the language model output component to first learn the same distribution of output provided by the first prediction network (i.e., a distribution of the predicted output speech element) as is expected by the joint network. Next, the language model output component is made to act as a regularizing constraint, preventing the predicted output speech element from becoming incompatible with the joint network. The language model output component is required for merely fine-tuning the first prediction network, and is not utilised for decoding. Therefore, decoding remains unaffected by such method of domain adaptation, and no changes are introduced to the adapted version of the E2E ASR model.

As an illustrative example, the parameters referred here can be neural network parameters, which are modified during network training. In this case part of the parameters are freezed (fixed) and hence not modified in the training process, thus constraining the training in a way which is beneficial for the goal of domain adaptation. As an example, the parameters of the prediction network used in the experiments consist of the weights of the LSTM nodes, which are organized in two layers, with 1536 nodes in each layer. We use a variant of LSTM nodes which have a projection layer, so the layer outputs are downscaled to 640 dimensions. The number of parameters in this case is about 20.6 millions. The language model output component is a single feed-forward layer, with weights and biases from each input to each output. That is, (640+1)*1001=641641 parameters, as we have a sub-word vocabulary of 1000 word pieces plus a word separator symbol.

Optionally, the first prediction network is fine-tuned using an adaptation loss function (I(P)) comprising at least an autoregressive language model loss function (CE(x,P)). The adaptation loss function (denoted as I(P)) relates to the losses associated with domain adaptation of the E2E ASR model. The autoregressive language model loss function and the adaptation loss function relate to a standard cross-entropy loss of the language model, which is induced by the first prediction network and the language model output component for the plurality of adaptation examples in the second set of transcriptions.

Optionally, the method further comprises generating, for each adaptation example (x) in the second set of transcriptions, a corresponding reference example ($\hat{x}$), and wherein the adaptation loss function also comprises a first regularization term, the first regularization term being a product of a balancing loss weight ($w_b$) and a summation of a balancing loss term ($l_b(x,P)$) for all reference examples in a third set ($D_b$) of transcriptions. The adaptation example relates to an utterance having n speech elements (namely, symbols) in the second set of transcriptions. Optionally, $x=x_0, \ldots, x_n$ denotes the adaptation example (namely, utterance) with n speech elements, prepended with a start symbol $x_0$. The corresponding reference example is generated for each adaptation example in the second set of transcriptions, by sampling the language model induced by the first prediction network and the language model output component. Optionally, a given reference example has a similar length to a given adaptation example.

The third set of transcriptions refers to a set of transcriptions of a plurality of reference examples. The third set of transcriptions, similarly to the first set of transcriptions and the second set of transcriptions, may have text-based data in multiple languages. Optionally, the third set of transcriptions, the second set of transcriptions and the first set of transcriptions relate to the same domain. However, the third set of transcriptions are not a part of the second set of transcriptions. The third set of transcriptions prevent the first prediction network from over-fitting to the second set of transcriptions.

The first regularization term is a term that penalises changes in the predicted output speech element that are observed with common utterances, to balance fitting of the first prediction network to the second set of transcriptions and the first set of transcriptions. Such a first regularization term promotes generalization ability of the first prediction network. Generalization ability refers to the first prediction network's ability to adapt properly to new, previously unseen data. The first regularization term is mathematically represented as:

$$w_b \sum_{x \in D_b} l_b(x, P)$$

The "balancing loss weight" refers to a weight of balancing loss or imbalance observed in the E2E ASR model for all reference examples in a third set of transcriptions. The balancing loss term measures the difference between the conditional probability distributions induced by the first prediction network and the second prediction network, for a given adaptation example. Beneficially, the first regularizing term utilizes a small balancing loss weight, thereby making the E2E ASR model simpler and avoiding overfitting. The balancing loss weight is selected to be such that it provides a good compromise between an accuracy of the domain adaptation and an accuracy of generalization.

Optionally, the conditional probability distribution outputted by the language model formed by the first prediction network and the language model output component is mathematically represented by $(P^*(X_i|x_{i-1})=L(P^*(x_{i-1})))$. The conditional probability distribution outputted by the language model formed by the second prediction network and the language model output component is mathematically represented by $(P(X_i|x_{i-1})=L(P(x_{i-1})))$. In such a case, the balancing loss term for adaptation example x is mathematically represented as:

$$l_b(x, P) = \frac{1}{n}\sum_{i=1}^{n} KLD(P^*(X_i | x_{i-1}), P(X_i | x_{i-1}))$$

wherein KLD is a Kullback-Leibler divergence and n denotes a number of speech elements.

Optionally, the adaptation loss function also comprises a second regularizing term $(w_n l_n(P))$, the second regularizing term being a product of a norm loss weight $(w_n)$ and a norm loss term $(l_n(P))$, wherein the norm loss term pertains to a drift in values of prediction weights between the first prediction network and the second prediction network. The second regularization term is a term that penalises changes (i.e., drifting of a weight in the second prediction network from an original value of the weight in the first prediction network) between the first prediction network (which is un-adapted) and the second prediction network (which is domain-adapted). The norm loss weight refers to a weight of normalisation that is observed in the E2E ASR model. The norm loss weight minimises errors since it normalises a loss of weight throughout the E2E ASR model. The norm loss term refers to a term of normalisation that measures the drift in values of prediction weights between the second prediction network and a first prediction network. Mathematically, the norm loss term is denoted as $l_n(P)=\|P-P^*\|_2$, wherein P denotes the second prediction network and P* denotes the first prediction network. Beneficially, the second regularizing term utilizes a small norm loss weight, thereby making the E2E ASR model simpler and avoiding overfitting.

Optionally, the adaptation loss function is a sum of the autoregressive language model loss function, the first regularization term and the second regularization term. Mathematically, the adaptation loss function is represented as:

$$l(P) = \sum_{x \in D_a} CE(x, P) + w_b \sum_{x \in D_b} l_b(x, P) + w_n l_n(P)$$

The adapted version of the E2E ASR model refers to a version of the E2E ASR model that is obtained post performing of the domain adaptation thereon. The second prediction network (of the adapted version of the E2E ASR model) is an adapted version of the first prediction network. The adapted version of the E2E ASR model may be utilized for speech to text conversion in multiple domains. Advantageously, the adapted version of the E2E ASR model maps the sequence of input acoustic signal frames into the sequence of output speech elements forming the word or series of words for multiple domains efficiently.

Optionally, the E2E ASR model is implemented as a recurrent neural network transducer (RNN-T) model that utilizes layer-normalized Long Short Term Memory (LSTM) networks with projection layers, wherein the encoder network and the given prediction network are recurrent neural networks (RNNs), and the joint network is a feed-forward network having a softmax output layer. Optionally, the given prediction network has a softmax output layer. The RNN-T model is a type of the E2E ASR model which transduces discrete acoustic signal frames which are received as an input, to output the conditional probability distribution over the next output speech element by learning alignments between sequences of the input and the output. Optionally, the RNN-T model is beneficial when streaming decoding is performed, since the streaming decoding utilises only a left context for predicting the next symbol while requiring recurrent hidden layers to be implemented as uni-directional layers.

Typically, layer normalization directly estimates normalization statistics from summed inputs to neurons within a hidden layer, so the normalization does not introduce any new dependencies between training cases. The LSTM network is a recurrent neural network (RNN) having feedback connections, meaning thereby, that the LSTM network can efficiently process entire sequences of data (such as speech). The layer-normalized LSTM networks refer to LSTM networks which have been layer-normalised, i.e., networks which estimate normalisation statistics for processing entire sequences of data. A given projection layer maps discrete word indices of an n-gram context to a continuous vector space. Since the given projection layer is shared, for contexts containing the same word multiple times, the same set of weights is applied to form each part of a projection vector. The recurrent neural networks (RNNs) are a type of artificial neural networks wherein connections between nodes form a directed graph along a temporal sequence. Moreover, RNNs are derived from feed-forward neural networks, and can use an internal state (memory) comprised therein for effectively processing variable length sequences of inputs.

Moreover, since the joint network is optionally the feed-forward network having the softmax output layer, the output of the joint network (i.e., the conditional probability distribution over the next output speech element) is a multidimensional vector. When a dimension of the multidimensional vector is R, the output encodes R−1 speech elements and a blank symbol. The joint network takes inputs from projection layers of the encoder network and the given prediction network. Optionally, the joint network also has a logits layer, wherein outputs of the logits layer are fed into the softmax layer. Optionally, in this regard, the outputs of the logits layer are the logit values, wherein the logit values are in a range of −infinity to +infinity. Optionally, the given prediction network has a softmax output layer. Optionally, a given softmax layer transforms values to a range of 0 to 1.

Optionally, the method further comprises training the RNN-T model by employing a RNN-T loss function which requires as input the first set of transcriptions and a training audio file(s) corresponding to the first set of transcriptions. The RNN-T loss function refers to the function of loss being observed with respect to the RNN-T model. Typically, the RNN-T loss function enforces temporal alignment of the first set of transcriptions and the training audio file, however RNN-T loss functions that do not enforce such temporal alignment can also be utilized in the method. The RNN-T loss function aims to improve log-likelihood of training data (i.e., the first set of transcriptions and the training audio file). Optionally, the RNN-T loss function is a negative log posterior of the conditional probability distribution over the next output speech element, given an input acoustic feature. The training audio file comprises audio corresponding to each training example in the first set of transcriptions, the audio being a sound associated with each training example. Since the RNN-T loss function inputs both the first set of transcriptions and the training audio file corresponding to the first set of transcriptions, training of the E2E ASR model with both text-based data and audio data increases the efficiency of the E2E ASR model.

Optionally, the step of training the RNN-T model was performed with Stochastic Gradient Descent (SGD) using a slowly decaying learning rate. The SGD reduces the computational burden, achieving faster iterations for a lower convergence rate, especially in high-dimensional optimization problems such as the training of the RNN-T model. Learning rate decay refers to a technique for training modern neural networks wherein the training is initiated with a large learning rate, which is decayed multiple times. Depending on requirements for training the RNN-T model, a rate of decay of the learning rate may be defined. For the RNN-T model, the learning rate is set to slowly decay. The slowly decaying learning rate assists in effective training and generalization of the RNN-T model. Optionally, a data augmentation technique is applied during the step of training the RNN-T model. The data augmentation technique (for example, such as SpecAugment) enables in reducing overfitting of the RNN-T model to the training data.

Optionally, the adapted version of the E2E ASR model provides an improvement over the un-adapted version of the E2E ASR model in terms of at least one of: word error rate (WER), word-level perplexity. The WER is a metric demonstrating the performance of the adapted version of the E2E ASR model over the un-adapted version of the E2E ASR model. The WER is utilised for measuring speech-to-text accuracy of both versions of the E2E ASR models, and WER calculation is well known in the art. Word-level perplexity refers to a measurement of an accuracy of the E2E ASR model (or the given prediction network therein) in predicting an output speech element. A low value of the word-level perplexity indicates that the E2E ASR model predicts the output speech element with high accuracy. The improvement provided by the adapted version of the E2E ASR model over the un-adapted version of the E2E ASR model is elucidated in detail in the 'Experimental Part' of the present disclosure.

The present disclosure also relates to the system for performing domain adaptation of an end-to-end (E2E) automatic speech recognition (ASR) model as described above. Various embodiments and variants disclosed above, with respect to the aforementioned first aspect, apply mutatis mutandis to the system.

The processor refers to hardware, software, firmware, or a combination of these, that controls overall operation of the system. The processor is configured to: obtain the un-adapted version of the E2E ASR model that is trained using the first set of transcriptions, train the language model output component to match the first prediction network, fine-tune the first prediction network for obtaining the second prediction network, and generate the adapted version of the E2E ASR model, for performing domain adaptation of the E2E ASR model. Optionally, the processor includes programmable and/or non-programmable components configured to store, process and/or share data and/or commands. Optionally, the processor includes an arrangement of local and/or remote computational devices that are capable of enhancing information to perform various computational tasks. Furthermore, it will be appreciated that the processor may relate to a single hardware processor and/or a plurality of hardware processors operating in a parallel or distributed architecture. In an example, the processor may include components such as memory, a network adapter and the like, to store, process and/or share data with other computing components.

Optionally, the system further comprises a data repository communicably coupled to the processor, wherein at least one of: a first set of transcriptions, a second set of transcriptions, is stored at the data repository. The data repository refers to a systematic collection of information that is associated with the system for performing domain adaptation of the E2E ASR model. Optionally, the data repository is implemented at a remote memory associated with the system. Examples of the remote memory may include, but are not limited to, a cloud-based memory, a blockchain-based memory, computer-cluster based memory (e.g.: Remote Direct Memory Access memory), and a distributed memory. Alternatively, optionally, the data repository is implemented at a local memory associated with the system. Examples of the local memory may include, but are not limited to, a Solid State Drive (SSD) memory (such as a flash memory, a memory stick, a Secure Digital (SD) card, and the like), a hard disk drive (HDD) memory, a floppy disk, a portable compact disc read-only memory (CD-ROM), and a digital versatile disk (DVD). Yet alternatively, optionally, the data repository is implemented in a distributed manner at both the remote memory and the local memory associated with the system. Optionally, the un-adapted version of the E2E ASR model is stored at the data repository. Moreover, optionally, the adapted version of the E2E ASR model is stored at the data repository.

Optionally, the system further comprises a microphone and a speech-controlled device that are communicably coupled to the processor, wherein the processor is further configured to:
    receive a speech input stream from the microphone;
    process the speech input stream using a given version of the E2E ASR model to generate conditional probability distributions over next output speech elements of the speech input stream;

decode the conditional probability distributions to generate a drive signal for the speech-controlled device; and control the speech-controlled device to perform a given task, based on the drive signal.

Optionally, the microphone refers to a device (specifically, a transducer), which converts sound into electrical signals. The microphone receives the speech input, and converts it into binary electrical signals which may be processed by the system. Optionally, the microphone is physically arranged in the speech-controlled device. Alternatively, optionally, the microphone is implemented as a separate device which is communicably coupled to other components of the system. Optionally, the speech input stream is processed using either the un-adapted version of the E2E ASR model or the adapted version of the E2E ASR model, for generating conditional probability distributions over the next output speech elements of the speech input stream. The term "speech-controlled device" refers to a device which is configured to perform certain tasks based on drive signals corresponding to speech or verbal commands. Such speech-controlled devices may utilise a voice-based user interface, in addition to the E2E ASR model. The drive signal is an electrical signal that is generated and sent to the speech-controlled device, by the processor, in order to control the speech-controlled device to perform the given task. The drive signal is generated by decoding the conditional probability distributions provided by the given version of the E2E ASR model. For example, the drive signal controls a speech-controlled music playing device to play a particular song based on a voice command to play said song.

Optionally, the processor is communicably coupled with at least one of the data repository, the microphone, and the speech-controlled device, via a wireless network. Examples of the wireless network include, but are not limited to, Wireless fidelity network (Wi-Fi), Bluetooth, internet, mesh network, sub-GHz network, cell phone network, wireless local area network (WLAN), wireless sensor network, satellite communication network, and terrestrial microwave network. Alternatively, optionally, the processor is communicably coupled with at least one of the data repository, the microphone, and the speech-controlled device, via a wired network. Examples of the wired network include, but are not limited to, telephone networks, cable network, television network, Internet network, and fiber-optic network.

Optionally, when decoding the conditional probability distributions, the processor is configured to implement a beam-search decoder for performing streaming decoding. The beam-search decoder employs a decoding algorithm to sample the conditional probability distribution outputted by the joint network of the E2E ASR model, to generate a most likely sequence of words. Such decoding algorithms are well-known in the art. The beam-search decoder restricts the maximum number of expanded hypotheses from frame-to-frame (of the acoustic signal frames in the speech input stream). Greater a beam width employed by the beam-search decoder, better is the streaming decoding accuracy and slower is a decoding speed, and vice versa. Streaming decoding is the technique of converting an encoded digital stream into audio, video, closed captions, and subtitles. When the beam-search decoder is implemented for performing streaming decoding, a technical effect which is provided is fast processing, as well as tractability.

Experimental Part

A test simulation for evaluating domain adaptation performances of the adapted version of the E2E ASR model and the un-adapted version of the E2E ASR model was performed. Moreover, RNN-T domain adaptation was also compared to shallow fusion. For shallow fusion experiments, an n-gram model was converted into a finite state transducer (FST), and weighted language model scores were added to alignment scores of the E2E ASR model after each emission of an adaptation example. The E2E ASR model was utilised with a beam-search decoder during inference, which restricts the maximum number of expanded hypotheses from frame-to-frame, while the beam width was set to 5. It was observed experimentally that the RNN-T adaptation provides significant accuracy gains (for example, approximately of 10-45%) in target tasks. Besides in-domain evaluation, the effect of adaptation to generalization using out-of-domain tasks was also studied experimentally, and it was experimentally shown that regularisation of the given prediction network improves this aspect.

The adapted version of the E2E ASR model utilised layer-normalized Long short-term memory (LSTM) networks with projection layers. A first layer of the encoder network was implemented as a convolutional layer with 1536 filters, and the acoustic signal frames inputted into the encoder network were 32 dimensional MEL filterbank energies, emitted 100 times a second. The convolutional layer reduced a frame rate of the acoustic signal frames to 30 ms/frame for the first two LSTM layer networks, after which a time reduction layer halved the frame rate to 60 ms/frame. Moreover, seven LSTM layers were provided, each with 1536 memory cells, and a projection dimension of 640. Additionally, while training the E2E ASR model, the encoder network was initially trained by employing the Connectionist Temporal Classification (CTC) loss function.

The first prediction network of the E2E ASR model consisted of two layers of layer-normalized LSTM networks with projection layers, each layer having 1536 cells and a projection dimension of 640. The first prediction network was initialised as a neural language model augmented with a softmax output layer, and was trained over a subset of the English Oscar corpus. The same word piece lexicon was used for the first prediction network as with the joint network, during the initialisation. Additionally, the joint network was implemented as a simple feed-forward network, which took the inputs from projection layers of the first prediction network and encoder network. A softmax activation was applied to the joint network output, resulting in a 1001-dimensional output vector, such that the joint network output encodes 1000 word pieces and a blank symbol. These word pieces and blank symbols are speech elements.

Furthermore, the training of the first prediction network and the joint network was performed using cross-entropy loss functions, until no error reduction over the training-time development set was observed. Such error reduction was observed to be approximately 20 epochs over the data. Training of a given network was performed with Stochastic Gradient Descent (SGD) using a slowly decaying learning rate, and SpecAugment was applied throughout the training for reducing overfitting to the training data.

The models (i.e., the adapted version of the E2E ASR model and the un-adapted version of the E2E ASR model) were trained using three public English speech corpora: LibriSpeech, English Common Voice (version 5.1, June 2020), and Ted-lium 3. Adaptation examples with durations in the 1-17 s range were chosen, resulting in 1.57M with approximately 2770 h of audio. During the training, a subset of Common Voice development set was used to monitor progress and determine when to stop. These well-known publicly available corpora were chosen to enable experiment reproducibility. The evaluations were carried out with three different datasets: Ted-lium 3, ATIS3, and Slurp.

For ATIS3, the evaluation utilised December 1993 test set with Crown microphone audios where multiple audios were available and adaptation utilised all unique transcriptions from the complete ATIS3 training corpus. For Slurp, the evaluation utilised the headset audio of each speaker for all test set transcriptions and adaptation utilised all the unique transcriptions from the non-synthetic training set. The Slurp dataset was divided to 18 distinct real-life application scenarios, and the evaluations were carried out both using per-scenario subsets and undivided datasets.

Table 1 given below summarizes the different datasets uses to measure the ASR accuracies with word error rate (WER) in all experiments. An amount of adaptation (in text) and an amount of evaluation (in audio) were considered in adaptation examples (namely, utterances), along with the size of the vocabulary for all datasets used in the experiments.

TABLE 1

| Dataset | Adaption | Evaluation | Vocabulary |
| --- | --- | --- | --- |
| ATIS3 | 6355 | 965 | 1080 |
| Slurp | 10680 | 4173 | 5168 |
| Ted-lium 3 | — | 1155 | 3652 |

Furthermore, the balancing loss weight and the norm loss weight were optimized over the Slurp dataset, wherein domain adaptation was carried out over Slurp training transcriptions. Such an optimisation portrayed that the method for performing domain adaptation of the E2E ASR model was not particularly sensitive to the exact values of the balancing loss weight and the norm loss weight. Therefore, the experiments were carried out with the same weights, with the balancing loss weight as 0.8, and the norm loss weight as 0.05. The domain adaptation was halted when an L2-norm change value of the given prediction network exceeded 4.

Next, word error rates of the un-adapted version of the E2E ASR model and the adapted version of the E2E ASR model were observed with respect to two different datasets—ATIS3 and Slurp, wherein the E2E ASR models were adapted with dedicated held-out transcriptions for evaluation. For Slurp dataset, both the undivided dataset and per-scenario adaptations were observed. Word error rates (WERs) for the un-adapted version E2E ASR model, word error rates (WERs) for the adapted version E2E ASR model, and a relative word error rate reduction (WERR) as found are presented in Table 2. The results are shown with the experimental E2E ASR model described above, as well as for a (different) production E2E ASR model.

TABLE 2

| Dataset | Un-adapted | Adapted | WERR-% |
| --- | --- | --- | --- |
| ATIS3 | 15.9% | 11.9% | −25.2% |
| Slurp (undivided) | 42.8% | 38.6% | −9.8% |
| Slurp (per-scenario) | 42.8% | 37.3% | −12.9% |
| ATIS3 (production) | 9.7% | 5.4% | −45% |
| Slurp (per-scenario; production) | 27.4% | 23.4% | −14.6% |

With the experimental E2E ASR model, the domain adaptation ran for 16 and 23 epochs over the ATIS3 and undivided Slurp data, respectively, until a maximum norm change condition was reached. The domain adaptation provides significant improvements in accuracy of the E2E ASR model, such improvements being achieved with remarkably small adaptation sets (including, for example, 6355 adaptation examples (namely, utterances) for ATIS3, and 10680 adaptation examples (namely, utterances) for Slurp).

For portraying the effect of the balancing loss weight in the method for performing domain adaptation of the E2E ASR model, ATIS3 training data was utilised for adapting the E2E ASR models with different balancing loss weights ($w_b$). Thereon, the E2E ASR models were tested with both ATIS3 and Ted-lium 3 datasets. It was observed that ATIS3 accuracy does not significantly vary with change in the balancing loss weight, but Ted-lium 3 error rates reduce as the balancing loss weight is increased. Balancing loss weight equal to 0.8 was obtained by optimizing the adaptation weights over the Slurp dataset, and it shows a good compromise between adapted accuracy and generalization. With this value of the balancing loss weight, Ted-lium 3 WER was observed to degrade from the un-adapted E2E ASR model's baseline by 5.5%, however the ATIS3 WER reduced by 25%. Increasing the balancing loss weight was observed to provide better generalization, such that with value 1.6, Ted-lium 3 results were observed to degrade only by 2.6% due to ATIS3 adaptation, while ATIS3 WER is reduced by 24%.

For understanding how the shallow fusion language model compares to the method for performing domain adaptation of the E2E ASR model, another evaluation with ATIS3 and Ted-lium 3 datasets was performed, wherein the shallow fusion weight was varied. The shallow fusion language model was a 4-gram model over speech elements, trained from the ATIS3 training set, and smoothed with absolute discounting. It was observed that shallow fusion improves the in-domain accuracy, as ATIS3 dataset WER drops to 11.1%. However, this comes at a severe cost to the generalization as the accuracy on the Ted-lium 3 set degrades drastically, even with small shallow fusion weights. It is also pertinent to note that although the shallow fusion language model can be trained from a limited amount of text-data and hence applied easily to customize an ASR system, it requires changes to be performed to the decoder. Eventually, a combination of shallow fusion method and the method for performing domain adaptation of the E2E ASR model was tested. ATIS3 dataset was used with the above mentioned 4-gram model and a WER of 9.2% was observed over the ATIS3 dataset, providing best results for maximizing the accuracy of domain adaptation, without concern for the generalization.

Results of the above-mentioned adaptation experiments (according to the method of the present disclosure) with in-domain and out-of-domain evaluations were also recorded graphically. The effect of changes in the balancing loss weight to the accuracy of the adapted and un-adapted E2E ASR models is graphically recorded in FIG. 5A, while the effect of variation in the shallow fusion weight to the accuracy of the shallow fusion language model is graphically recorded in FIG. 5B. These figures are described later in more detail.

Furthermore, the improvements obtained by the text-only domain adaptation of the second prediction network suggests that it behaves like a language model. To analyze this characteristic further, perplexity experiments were performed with the second prediction network and its language model output component at different stages of training, namely the network initialization, RNN-T training (including training of the language model output component and fine-tuning of the first prediction network to obtain the second prediction network), and domain adaptation. Three held-out evaluations sets were used, matching the data used in the above-mentioned stages: Oscar corpus subset, LibriSpeech test-clean transcripts, and ATIS3 adaptation set, the results of which are summarised in Table 3. Word-level perplexities of held-out evaluation text corpora computed with the second prediction network at different stages of training and adaptation are presented in Table 3.

TABLE 3

| | | Perplexity | | |
|---|---|---|---|---|
| S. No. | Model | Oscar | LibriSpeech | ATIS3 |
| 1 | Initialising LM | 122.2 | 284.1 | 235.1 |
| 2 | RNN-T | 149.3 | 290.2 | 272.1 |
| 3 | RNN-t, new LM output | 179.8 | 229.8 | 258.1 |
| 4 | ATIS3 adapted RNN-T | 195.8 | 250.0 | 23.2 |
| 5 | RNN-T, uninitialized P | 1252.2 | 395.6 | 1053.3 |

Herein, model no. 1 is the language model used to initialize the first prediction network prior to the RNN-T training. This model was trained from the Oscar corpus, and it demonstrates the lowest perplexities with the Oscar dataset. Model no. 2 is obtained after RNN-T training but prior to the estimation of language model output component. Model no. 2 reuses the feed-forward and softmax layers from model no. 1. Although the RNN-T training contained LibriSpeech transcript, improvements in the held-out LibriSpeech dataset perplexity were not observed until the language model output component was re-trained with the speech transcripts to obtain model no. 3. However, the perplexity over the Oscar dataset was observed to degrade with the replacement of the language model output. Eventually, after adaptation with the ATIS3 training data in model no. 4, to obtain the second prediction network, an improvement in the corresponding dataset perplexity was observed. For comparison, the ATIS3 dataset perplexity with a 5-gram model trained over the adaptation set with word piece segmentation was 35.6.

The perplexity experiments conclusively demonstrated that the second prediction network and the language model output component perform well as a language model when observed together. During RNN-T training, the first prediction network learnt to predict the type of utterances contained in the training data. However, in order to take advantage of the language model property of the first prediction network and the language model output component, a new language model output layer was trained after the RNN-T training since the language model output layer is analogous to the joint network, and during RNN-T training both the first prediction network and the joint network may change in unison.

Notably, good perplexities for model no. 2 demonstrate that representations of the trained first prediction network are sufficiently close to the original, such that even the output layer of the initializing language model works suitably. This suggested that the initialization of the first prediction network has an important role. The results from the last row of Table 3 showed how the lack of a proper initialization degraded the quality of the second prediction network as the language model. It was observed that the initialization not only assisted in the language model task, but is also beneficial for ASR accuracy. Without the initialization, the WER over the Ted-lium 3 dataset degraded from 13.9% to 15.3%.

Lastly, an experimental comparison was performed between an internal language model of the E2E ASR model being taken from the softmax output of the joint network, and the given prediction network being used with a dedicated language model output layer. It was observed that the perplexities of the internal language model taken through the joint network were worse compared to the perplexities presented in Table 3. For example, the baseline RNN-T word-level perplexity over the LibriSpeech test-set became 1084.0, compared to 290.2 with the given prediction network and the LM output layer. Therefore, it is experimentally verified that when the (separate) language model output component is used, the given prediction network provides a reasonable performance as a language model. The experimental evidence of the improvements obtained from adapting the given prediction network indicate that the language model interpretation of the given prediction network is not only justified, but is also practical.

DETAILED DESCRIPTION OF THE DRAWINGS

Figure 1:
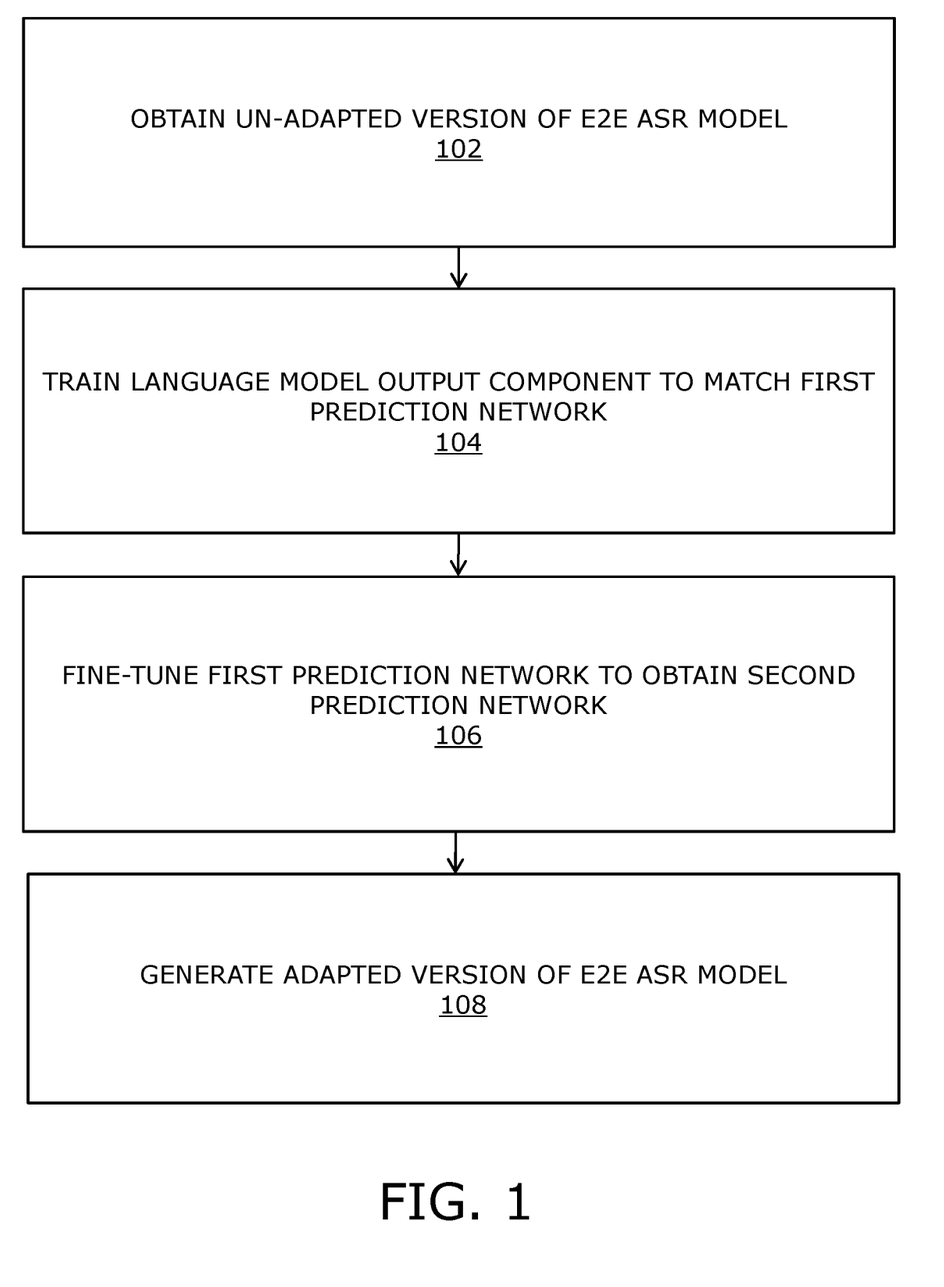
FIG. 1 is a flowchart depicting steps of a method for performing domain adaptation of an end-to-end (E2E) automatic speech recognition (ASR) model, in accordance with an embodiment of the present disclosure.

FIG. 1 is a flowchart depicting steps of a method for performing domain adaptation of an end-to-end (E2E) automatic speech recognition (ASR) model, in accordance with an embodiment of the present disclosure. At step 102, an un-adapted version of the E2E ASR model that is trained using a first set of transcriptions is obtained, wherein the un-adapted version of the E2E ASR model comprises an encoder network, a first prediction network, and a joint network. The encoder network receives acoustic signal frames and outputs encoded acoustic signal frames; a given prediction network receives at least one previous output speech element and outputs a predicted output speech element, the predicted output speech element being predicted based on the at least one previous output speech element; and the joint network receives and processes the encoded acoustic signal frames and the predicted output speech element to output a conditional probability distribution over a next output speech element. At step 104, a language model output component is trained to match the first prediction network using the first set of transcriptions while parameters of the first prediction network are kept fixed, wherein the language model output component and the first prediction network collectively induce a language model. At step 106, the first prediction network is fine-tuned using a second set of transcriptions for obtaining a second prediction network, while parameters of the language model output component are kept fixed. At step 108, an adapted version of the E2E ASR model is generated, wherein the adapted version of the E2E ASR model comprises the encoder network, the second prediction network, the language model output component, and the joint network.

The steps 102, 104, 106, and 108 are only illustrative and other alternatives can also be provided where one or more steps are added, one or more steps are removed, or one or more steps are provided in a different sequence without departing from the scope of the claims herein.

Figure 2:
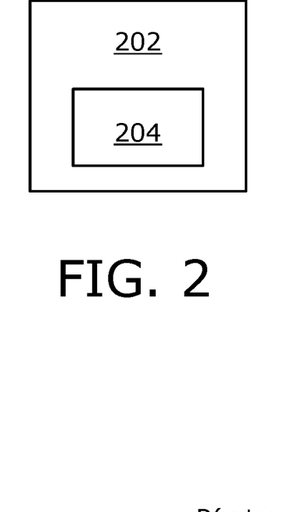
FIGS. 2 and 3 illustrate block diagrams of a system for performing domain adaptation of an end-to-end (E2E) automatic speech recognition (ASR) model, in accordance with different embodiments of the present disclosure.

Referring to FIG. 2, illustrated is a block diagram of a system 202 for performing domain adaptation of an end-to-end (E2E) automatic speech recognition (ASR) model, in accordance with an embodiment of the present disclosure. The system 202 comprises a processor 204 configured to execute a method for performing domain adaptation of the E2E ASR model.

Figure 3:
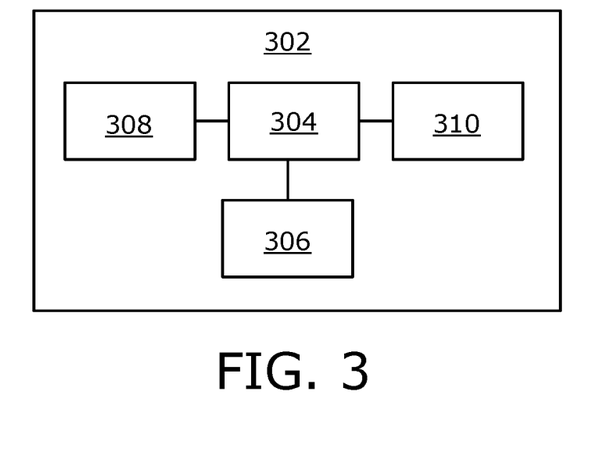

Referring to FIG. 3, illustrated is a block diagram of a system 302 for performing domain adaptation of an end-to-end (E2E) automatic speech recognition (ASR) model, in accordance with another embodiment of the present disclosure. The system 302 comprises a processor 304, a data repository 306, a microphone 308, and a speech-controlled device 310. The processor 304 is communicably coupled to the data repository 306, the microphone 308, and the speech-controlled device 310.

Figure 4:
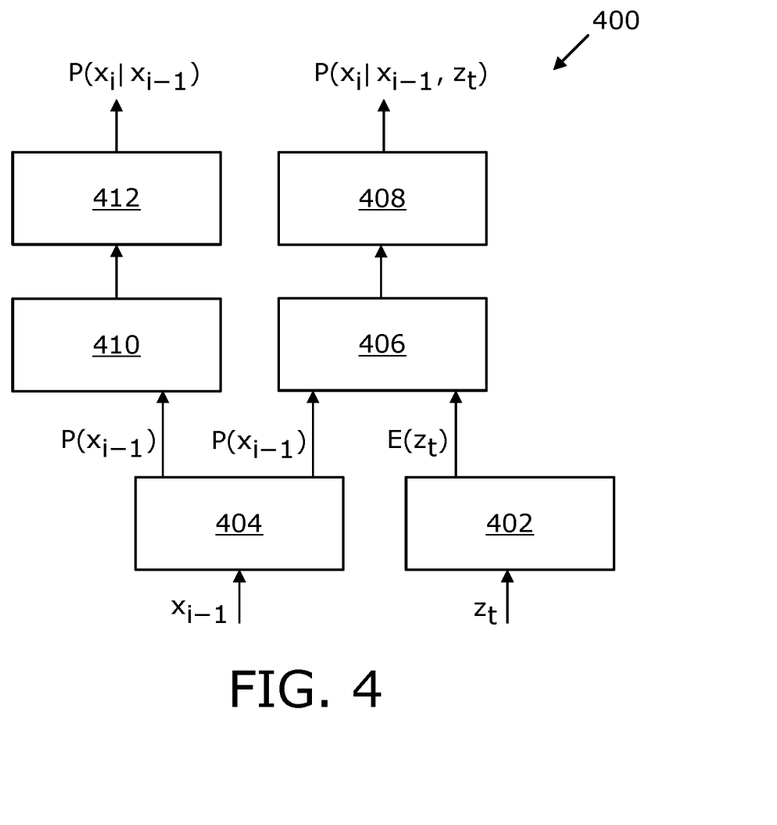
FIG. 4 illustrates an architecture of an end-to-end (E2E) automatic speech recognition (ASR) model, in accordance with an embodiment of the present disclosure.

FIG. 4 illustrates an architecture of an end-to-end (E2E) automatic speech recognition (ASR) model 400, in accordance with an embodiment of the present disclosure. An adapted version of the E2E ASR model 400 is shown to have an encoder network 402, a second prediction network 404, and a joint network 406. Herein, the encoder network 402 receives acoustic signal frames ($Z_t$) as input, and outputs encoded acoustic signal frames ($E(Z_t)$) to the joint network 406. Additionally, the second prediction network 404 receives at least one previous output speech element ($X_{i-1}$) as an input, and outputs a predicted output speech element $P(x_{i-1})$ to the joint network 406. The joint network 406 receives and processes the encoded acoustic signal frames ($E(Z_t)$) and the predicted output speech element $P(x_{i-1})$ to output a conditional probability distribution $P(x_i|x_{i-1}, Z_t))$ over a next output speech element, after passing the same through a softmax output layer 408. A language model output component 410 is trained to match a first prediction network (not shown) using a first set of transcriptions, while keeping parameters of the first prediction network fixed. Further, while keeping parameters of the language model output component 410 fixed, a second set of transcriptions is used to fine-tune the first prediction network for obtaining the second prediction network 404. Herein, the language model output component 410 and a given prediction network collectively induce a language model. The language model output component 410 is a feed-forward network having a softmax output layer 412, the language model output component 410 outputting a conditional probability distribution ($P(X_i|x_{i-1})$) over the predicted output speech element.

Figure 5A:
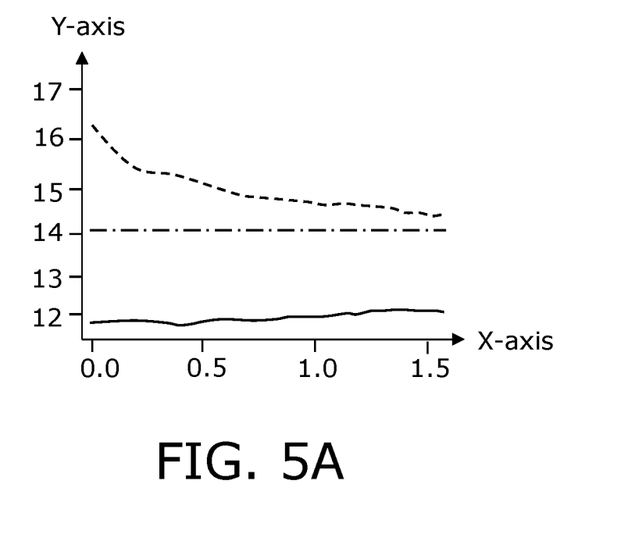
FIGS. 5A and 5B are graphical representations illustrating adaptation experiments with in-domain and out-of-domain evaluations, in accordance with an embodiment of the present disclosure.
Figure 5B:
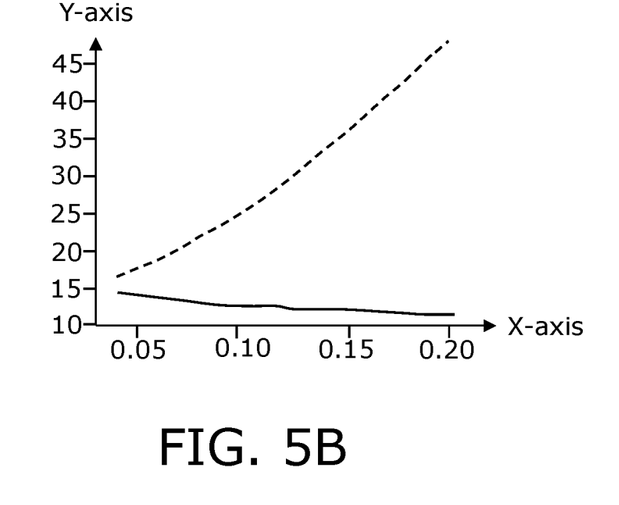

FIGS. 5A and 5B are graphical representations illustrating adaptation experiments with in-domain and out-of-domain, in accordance with an embodiment of the present disclosure. FIG. 5A illustrates a graphical representation of an effect of changes in the balancing loss weight to an accuracy of adapted and un-adapted E2E ASR models. Herein, X-axis represents a balancing loss weight, while Y-axis represents an accuracy (determined in terms of word error rate). A trend followed by an ATIS3 speech corpus is depicted by a solid line, a trend followed by a Ted-lium 3 speech corpus adapted using ATIS3 is depicted by a dashed line, and a trend followed by an un-adapted Ted-lium 3 speech corpus is depicted by a dashed-dot line. Based on the graphical representation, it is observed that the accuracy for the ATIS3 speech corpus and the un-adapted Ted-lium 3 speech corpus does not significantly vary with the balancing loss weight. However, the word error rate reduces for the Ted-lium 3 speech corpus adapted using ATIS3, indicating an increase in the accuracy as the balancing loss weight is increased.

FIG. 5B illustrates a graphical representation of an effect of variation in the shallow fusion weight to the accuracy (determined in terms of word error rate) of the shallow fusion language model. Herein, X-axis represents a shallow fusion weight, while Y-axis represents the word error rate. A trend followed by an ATIS3 speech corpus is depicted by a solid line, and a trend followed by a Ted-lium 3 speech corpus adapted using ATIS3 is depicted by a dashed line. Based on the graphical representation, it is observed that shallow fusion improves the in-domain accuracy since the word error rate reduces for the ATIS3 speech corpus, indicating an increase in the accuracy. However, the accuracy for the Ted-lium 3 speech corpus adapted using ATIS3 drastically reduces (since the word error rate drastically increases), even with small shallow fusion weights. With the combined teachings of FIGS. 5A and 5B, it is experimentally observed that the domain adaptation provides significant improvements in accuracy of an E2E ASR model. Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:

1. An apparatus for performing domain adaptation of an end-to-end (E2E) automatic speech recognition (ASR) model, the apparatus comprising at least one hardware processor, wherein the at least one hardware processor is configured to:
   obtain an un-adapted version of the E2E ASR model trained using a first set of transcriptions, wherein the un-adapted version of the E2E ASR model comprises:
      an encoder network configured to receive acoustic signal frames and output encoded acoustic signal frames;
      a first prediction network configured to output a predicted output speech element based on at least one received previous output speech element; and
      a joint network configured to receive and process the encoded acoustic signal frames from the encoder network and the predicted output speech element of the first prediction network to produce logit values, convert the logit values into a conditional probability distribution over a next output speech element and output the conditional probability distribution;
   train a language model output component using the first set of transcriptions, wherein the language model output component is optimized to match the output of the first prediction network using an autoregressive language model loss function while keeping parameters of the first prediction network fixed;
   fine-tune the first prediction network using a second set of transcriptions to obtain a second prediction network, wherein the fine-tuning is constrained using at least two regularization terms; wherein
      a first regularization term minimizes divergence between the first prediction network and the second prediction network, preventing overfitting to the second set of transcriptions; and
      a second regularization term limits a magnitude of weight updates in the second prediction network to ensure that generalization capabilities of the E2E ASR model are retained; and
   generate the adapted version of the E2E ASR model, wherein the adapted version of the E2E ASR model comprises the encoder network, the second prediction network, the joint network, and the language model output component, wherein the language model output component regularizes domain adaptation without modification to decoding mechanisms of the E2E ASR model.

2. The apparatus according to claim 1, wherein the E2E ASR model is implemented as a recurrent neural network transducer (RNN-T) model that utilizes layer-normalized Long Short Term Memory (LSTM) networks with projection layers, and the encoder network and the first prediction network are recurrent neural networks (RNNs), and the joint network is a feed-forward network having a softmax output layer.

3. The apparatus according to claim 2, wherein the at least one hardware processor is further configured to train the RNN-T model by employing a RNN-T loss function which requires as input the first set of transcriptions and a training audio file corresponding to the first set of transcriptions.

4. The apparatus according to claim 3, wherein the at least one hardware processor is further configured to train the RNN-T model with Stochastic Gradient Descent (SGD) using a decaying learning rate.

5. The apparatus according to claim 1 wherein the fine-tuning of the first prediction network is performed using an adaptation loss function, wherein the adaptation loss function includes at least one regularization term to constrain the fine-tuning and maintain generalization capabilities, and wherein the training of the language model output component is performed-prior to fine-tuning the first prediction network.

6. The apparatus according to claim 1 wherein the language model output component is a feed-forward network having a softmax output layer, and the at least one hardware processor is further configured to enable the language model output component to output a conditional probability distribution over the predicted output speech element.

7. A computer implemented method for performing domain adaptation of an end-to-end (E2E) automatic speech recognition (ASR) model, the method comprising:
    obtaining an un-adapted version of the E2E ASR model trained using a first set of transcriptions, wherein the un-adapted version of the E2E ASR model comprises:
        an encoder network configured to receive acoustic signal frames and output encoded acoustic signal frames;
        a first prediction network configured to output a predicted output speech element based on at least one received previous output speech element; and
        a joint network configured to receive and process the encoded acoustic signal frames from the encoder network and the predicted output speech element of the first prediction network to produce logit values, convert the logit values into a conditional probability distribution over a next output speech element and output the conditional probability distribution;
    training a language model output component using the first set of transcriptions, wherein the language model output component is optimized to match the output of the first prediction network using an autoregressive language model loss function while keeping parameters of the first prediction network fixed;
    the first prediction network using a second set of transcriptions to obtain a second prediction network, wherein the fine-tuning is constrained using at least two regularization terms; wherein:
        a first regularization term minimizes divergence between the first prediction network and the second prediction network, preventing overfitting to the second set of transcriptions; and
        a second regularization term limits a magnitude of weight updates in the second prediction network to ensure that generalization capabilities of the E2E ASR model are retained; and
    generating the adapted version of the E2E ASR model, wherein the adapted version of the E2E ASR model comprises the encoder network, the second prediction network, the joint network and the language model output component, wherein the language model output component regularizes domain adaptation without modification to decoding mechanisms of the E2E ASR model.

8. The computer implemented method according to claim 7, wherein the E2E ASR model is implemented as a recurrent neural network transducer (RNN-T) model that utilizes layer-normalized Long Short Term Memory (LSTM) networks with projection layers, the encoder network and the first prediction network are recurrent neural networks (RNNs), and the joint network is a feed-forward network having a softmax output layer.

9. The computer implemented method according to claim 8, wherein the method further includes training the RNN-T model by employing a RNN-T loss function which requires as input the first set of transcriptions and a training audio file corresponding to the first set of transcriptions.

10. The computer implemented method according to claim 9, wherein the method further comprises training the RNN-T model with Stochastic Gradient Descent (SGD) using a decaying learning rate.

11. The computer implemented method according to claim 7 wherein the method further comprises fine-tuning of the first prediction network using an adaptation loss function, wherein the adaptation loss function includes at least one regularization term to constrain fine-tuning and maintain generalization capabilities, and wherein the training of the language model output component is performed prior to fine-tuning the first prediction network.

12. The computer implemented method according to claim 11 wherein the method further comprises generating, for each adaptation example in the second set of transcriptions, a corresponding reference example, and wherein the adaptation loss function also comprises the first regularization term, the first regularization term being a product of a balancing loss weight and a summation of a balancing loss term for all reference examples in a third set of transcriptions.

13. The apparatus according to claim 1, wherein the joint network is further configured to receive the encoded acoustic signal frames and a predicted output speech element from the second prediction network and output a conditional probability distribution over a next output speech element.

14. The computer implemented method according to claim 7, wherein the method further includes the joint network receiving the encoded acoustic signal frames and a predicted output speech element from the second prediction network and generating an output of a conditional probability distribution over a next output speech element.

* * * * *